United States Patent
Lee et al.

(10) Patent No.: US 9,432,265 B2
(45) Date of Patent: Aug. 30, 2016

(54) VIRTUAL MACHINE SEQUENCE SYSTEM AND METHOD

(71) Applicant: Zijilai Innovative Services Co., Ltd., Shenzhen (TW)

(72) Inventors: Chung-I Lee, New Taipei (TW);
Chiu-Hua Lu, New Taipei (TW);
Tsung-Hsin Yen, New Taipei (TW);
Chien-Chih Lin, New Taipei (TW);
Lee-Fan Chang, New Taipei (TW);
Yu-Chun Lin, New Taipei (TW)

(73) Assignee: Zijilai Innovative Services Co., Ltd., Shenzhen (CN)

( * ) Notice: Subject to any disclaimer, the term of this patent is extended or adjusted under 35 U.S.C. 154(b) by 551 days.

(21) Appl. No.: 13/971,933

(22) Filed: Aug. 21, 2013

(65) Prior Publication Data

US 2014/0181296 A1  Jun. 26, 2014

(30) Foreign Application Priority Data

Dec. 26, 2012  (TW) .............................. 101150006 A

(51) Int. Cl.
| | |
|---|---|
| *G06F 15/16* | (2006.01) |
| *H04L 12/24* | (2006.01) |
| *H04L 29/08* | (2006.01) |
| *H04L 12/26* | (2006.01) |

(52) U.S. Cl.
CPC .......... *H04L 41/28* (2013.01); *H04L 29/08072* (2013.01); *H04L 41/22* (2013.01); *H04L 43/0817* (2013.01)

(58) Field of Classification Search
CPC ......................... H04L 29/06; H04L 29/08072
USPC .................... 709/220, 224, 227, 228; 380/28
See application file for complete search history.

(56) References Cited

U.S. PATENT DOCUMENTS

| | | | | |
|---|---|---|---|---|
| 8,789,044 B2 * | 7/2014 | Iikura | ....................... | G06F 8/63 718/1 |
| 8,925,075 B2 * | 12/2014 | Krendelev | .............. | H04L 9/008 380/28 |
| 2011/0302580 A1 * | 12/2011 | Iikura | ....................... | G06F 8/63 718/1 |
| 2013/0275598 A1 * | 10/2013 | Hohenstein | ........... | H04L 41/142 709/226 |
| 2014/0181296 A1 * | 6/2014 | Lee | ......................... | H04L 41/28 709/224 |

* cited by examiner

*Primary Examiner* — Khanh Dinh
(74) *Attorney, Agent, or Firm* — Zhigang Ma

(57) ABSTRACT

A remote computer monitors virtual machines in cloud servers of a data center. The remote computer obtains parameters of each virtual machine authorized to a user by a monitoring program when a user logs in a login interface in a client computer. The remote computer calculates a resource coefficient of each virtual machine according to the parameters of the virtual machine authorized to the user. The remote computer displays an icon corresponding to each virtual machine in the login interface according to the resource coefficient of each virtual machine.

15 Claims, 5 Drawing Sheets

VIRTUAL MACHINE SEQUENCE SYSTEM AND METHOD

BACKGROUND

1. Technical Field

Embodiments of the present disclosure relate to virtualization technology, and particularly to a system and method for sequencing virtual machines in cloud servers of a data center.

2. Description of Related Art

Virtual machines (VMs) are software implementation that virtualizes a personal computer or a server on an operating system (kernel) layer. By using the VMs, multiple operating systems can co-exist and run independently on the same computer. At present, a user may be authorized to access a plurality of the virtual machines. As shown in FIG. 4, a login interface 600 including an icon 601 of each virtual machine is provided for the user to access the virtual machine. However, the icons 601 of the virtual machines are displayed in the login interface 600 according to a specific rule (e.g., an order of names of the icons 601). In some situation, the user may need to take much time to search for the icon 601 of the virtual machine which is frequently used by the user. Thus, there is room for improvement in the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

In general, the word "module", as used herein, refers to logic embodied in hardware or firmware, or to a collection of software instructions, written in a programming language, such as, Java, C, or assembly. Each software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
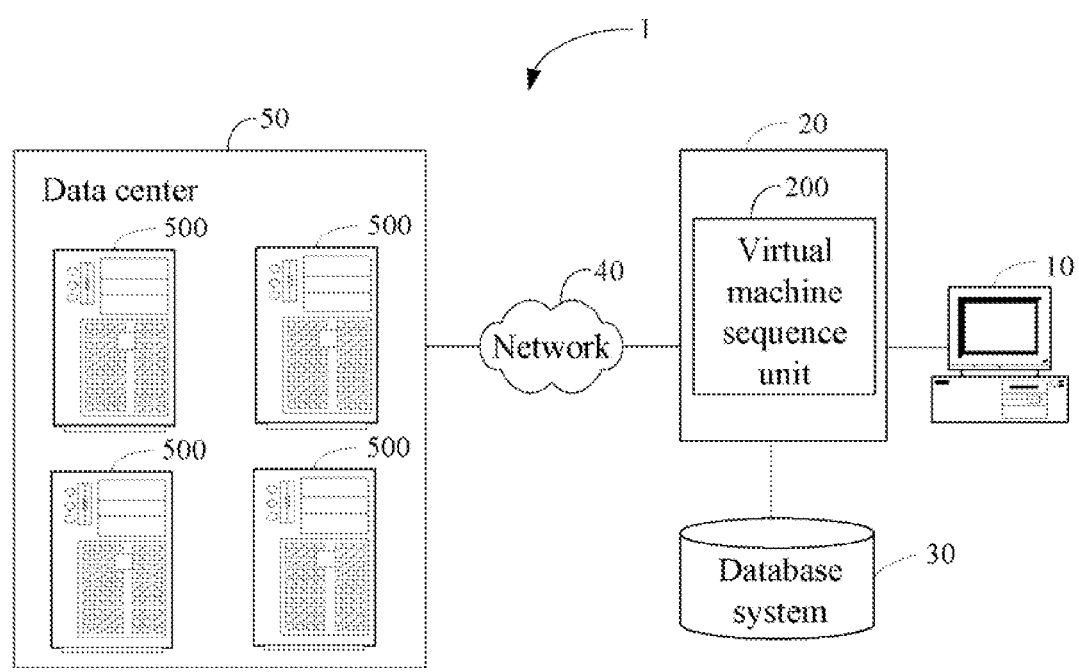
FIG. 1 is a schematic block diagram of one embodiment of a virtual machine sequence system.
Figure 4:
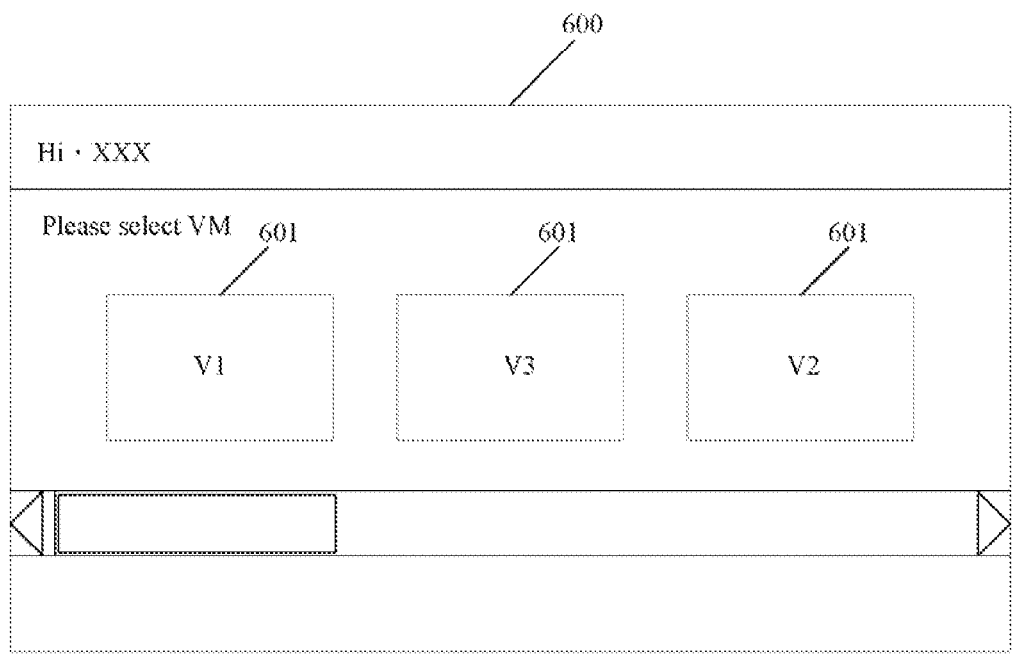
FIG. 4 illustrates a login interface showing icons before sequence.
Figure 5:
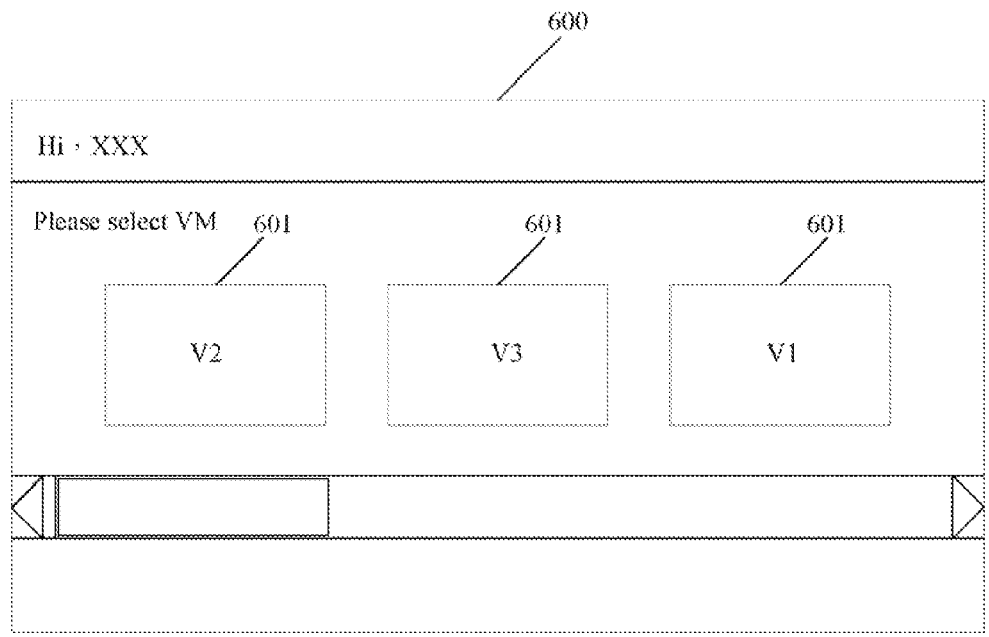
FIG. 5 illustrates the login interface showing icons after the sequence.

FIG. 1 is a system view of one embodiment of a virtual machine sequence system 1. In one embodiment, the virtual machine sequence system 1 may include a remote computer 20 and a data center 50. The data center 50 is designed for cloud computing capability and capacity including a plurality of cloud servers 500. Each virtual machine is installed in each cloud server 500. The remote computer 20 is connected to the data center 50 by a network 40. The network 40 may be, but is not limited to, a wide area network (e.g., the Internet) or a local area network. The virtual machine sequence system 1 schedules to start each virtual machine at an interval. The remote computer 20 connects to a database system 30 using a data connectivity, such as open database connectivity (ODBC) or java database connectivity (JDBC), for example. Additionally, each client computers 10 connects to the remote computer 20. Each client computer 10 provides a login interface 600 as shown in FIG. 4 or FIG. 5, which is displayed on a displaying device of the client computer 10, for a user to access the virtual machines stored in the data center 50. The user may input an ID and a password using an input device (e.g., a keyboard) and logs in the login interface 600. In one embodiment, the login interface 600 includes each icons 601, such as the icons V1, V2, and V3. Each icon 601 in the login interface 600 represents a virtual machine, for example, the icon V1 represents the virtual machine V1. Additionally, in the login interface 600, if the user selects an icon 601, the client computer 10 is activated to access the virtual machine represented by the icon 601. For example, if the icon V1 is selected, the client computer 10 accesses the virtual machine V1.

To manage each virtual machine installed in each cloud server 500, a virtual machine management application (e.g., HYPERVISOR) is also installed in each cloud server 500. The virtual machine management application manages and monitors execution of each virtual machine. The virtual machine management application obtains parameters of each virtual machine in the cloud server 500. The parameters of each virtual machine in the cloud server 500 include a CPU utilization rate (e.g., 80%, a percentage capacity usage of a CPU) of the virtual machine in the cloud server 500, a memory utilization rate of the virtual machine in the cloud server 500, an application utilization rate of the virtual machine in the cloud server 500, a total running time of the virtual machine in the cloud server 500. The application utilization rate is a ration of the number of running applications in the virtual machine to the total number of the applications in the virtual machine, for example, if fifty applications are installed in the virtual machine, and twenty applications in the virtual machine are currently running, then the application utilization rate of the virtual machine is 20/50=40%.

The remote computer 20, in one example, may also be a dynamic host configuration protocol (DHCP) server, which provides a DHCP service. In one embodiment, the remote computer 20 assigns Internet protocol (IP) addresses to the cloud servers 500 using the DHCP service. In one embodiment, the remote computer 20 uses dynamic allocation to assign the IP addresses to the cloud servers 500. For example, when the remote computer 20 receives a request from a cloud server 500 by the network 40, the remote computer 20 dynamically assigns an IP address to the cloud server 500. In one embodiment, the remote computer 20 may be a personal computer (PC), a network server, or any other data-processing equipment which can provide IP address allocation function.

Figure 2:
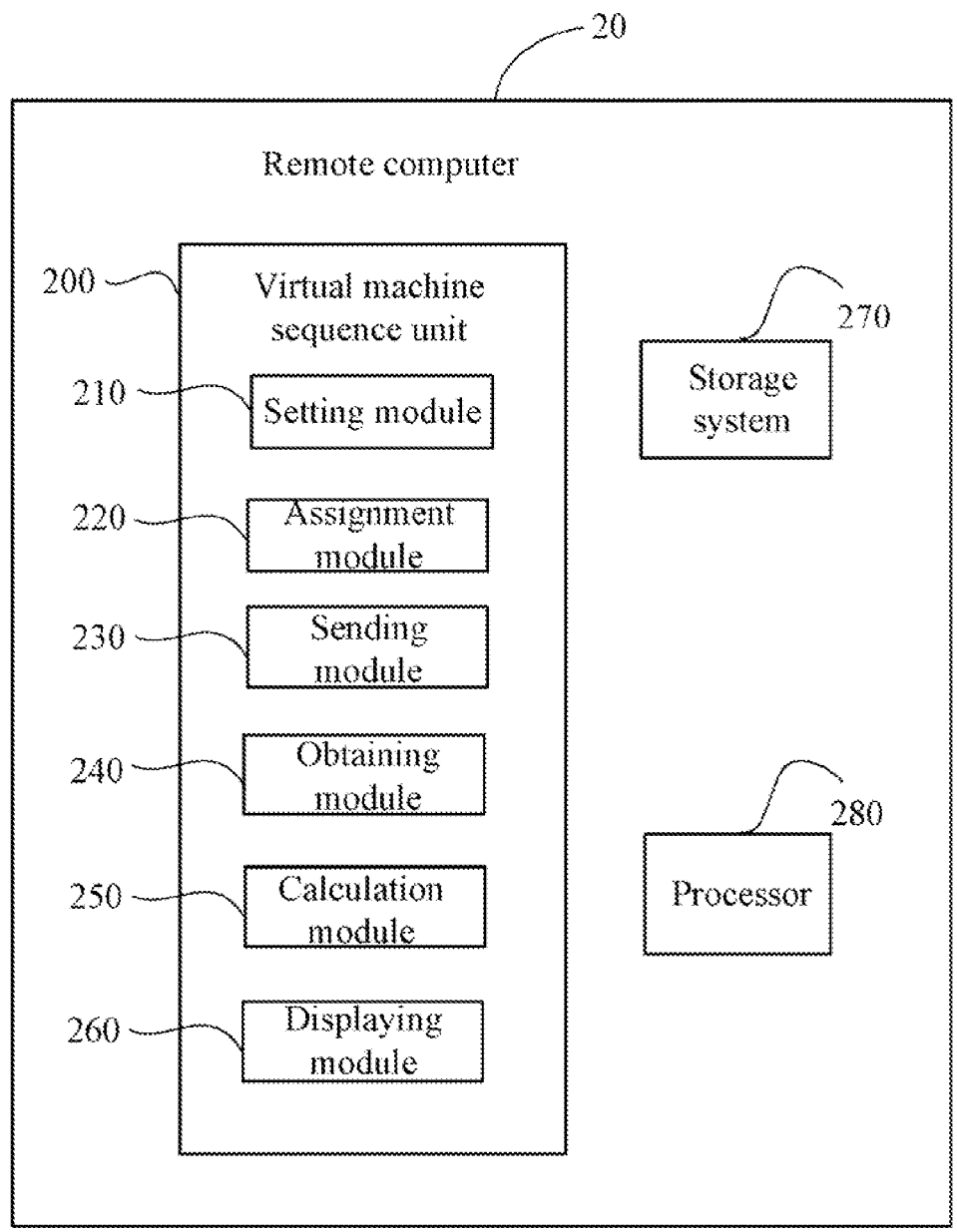
FIG. 2 is a block diagram of one embodiment of function modules of a remote computer included in FIG. 1.

FIG. 2 is a block diagram of one embodiment of function modules of the remote computer 20. The remote computer 20 includes a virtual machine sequence unit 200. The virtual machine management unit 200 sequences the virtual machines stored in the cloud servers 500. The remote computer 20 further includes a storage system 270, and at least one processor 280. In one embodiment, the monitoring unit 20 includes a setting module 210, an assignment module 220, a sending module 230, an obtaining module 240, a calculation module 250 and a starting module 260. The modules 210-260 may include computerized code in the form of each program that is stored in the storage system 270. The computerized code includes instructions that are executed by the at least one processor 280 to provide functions for the modules 210-260. The storage system 270 may be a memory, such as an EPROM, hard disk drive (HDD), or flash memory.

The setting module 210 sets a monitoring program, and stores the monitoring program in the storage system 270 of the remote computer 20. The monitoring program obtains parameters of the virtual machines from the virtual machine management application.

The assignment module 220 assigns an IP address by the DHCP service to each cloud server 500 of the data center 50 and communicates with each cloud server 500 by the assigned IP address.

The sending module 230 sends the monitoring program to each cloud server 500. In one embodiment, the monitoring program is installed in each cloud server 500 of the data center 50.

The obtaining module 240 obtains the parameters of each virtual machine authorized to a user by the monitoring program when the user logs in a login interface 600 in the client computer 10. Each virtual machine authorized to the user may be installed in each cloud servers 500. For example, each virtual machine authorized to the user is installed in one of the cloud servers A, B and C. In one embodiment, when the user logs in a login interface 600, the obtaining module 240 searches for names of each virtual machine authorized to the user in the data center 50, and obtains parameters of each virtual machine authorized to the user by the monitoring program. For example, if the virtual machines authorized to the user are V1, V2, and V3, and the virtual machine V1 is installed in the cloud server A, the virtual machine V2 is installed in the cloud server B, the virtual machine V3 is installed in the cloud server C, then the obtaining module 240 obtains the parameters of the virtual machine V1 from the monitoring program installed in the cloud server A, the obtaining module 240 obtains the parameters of the virtual machine V2 from the monitoring program installed in the cloud server B, and the obtaining module 240 obtains the parameters of the virtual machine V3 from the monitoring program installed in the cloud server C.

The calculation module 250 calculates a resource coefficient of each virtual machine according to the parameters of the virtual machine authorized to the user. The resource coefficient of each virtual machine is calculated by a formula as follow: USE(VM)=VMcoefficient+Wk×VMUsage, where USE(VM) represents the resource coefficient of the virtual machine.

VMcoefficient=Wc×f(VMCPU)+Wm×g(VMMemory)+Wr×k(VMProcess), where f(VMCPU) represents the CPU utilization rate (e.g., 80%, a percentage capacity usage of a CPU) of the virtual machine in the cloud server 500, g(VMMemory) represents the memory utilization rate of the virtual machine in the cloud server 500, k(VMProcess) represents the application utilization rate of the virtual machine in the cloud server 500, Wk, Wm and Wr are constants predetermined by the user according to experience.

VMUsage=Select(VMt)/T, where Select(VMt) represents the total running time of the virtual machine in the cloud server 500, and T represents a time unit (e.g., 60 second).

The displaying module 260 displays the icons 601 of each virtual machine in the login interface 600 in an order that is determined according to the resource coefficients of each virtual machine. In one embodiment, the icon 601 corresponding to each virtual machine in the login interface 600 is displayed in an order of the resource coefficient of each virtual machine. For example, if three virtual machines corresponds to the user, namely V1, V2 and V3, the resource coefficient of the virtual machine V1 is 0.71, the resource coefficient of the virtual machine V2 is 3.09, the resource coefficient of the virtual machine V3 is 1.31, the icons V1, V2 and V3 are displayed in the login interface 600 in an order of V2, V1 and V3 as shown in FIG. 5.

Figure 3:
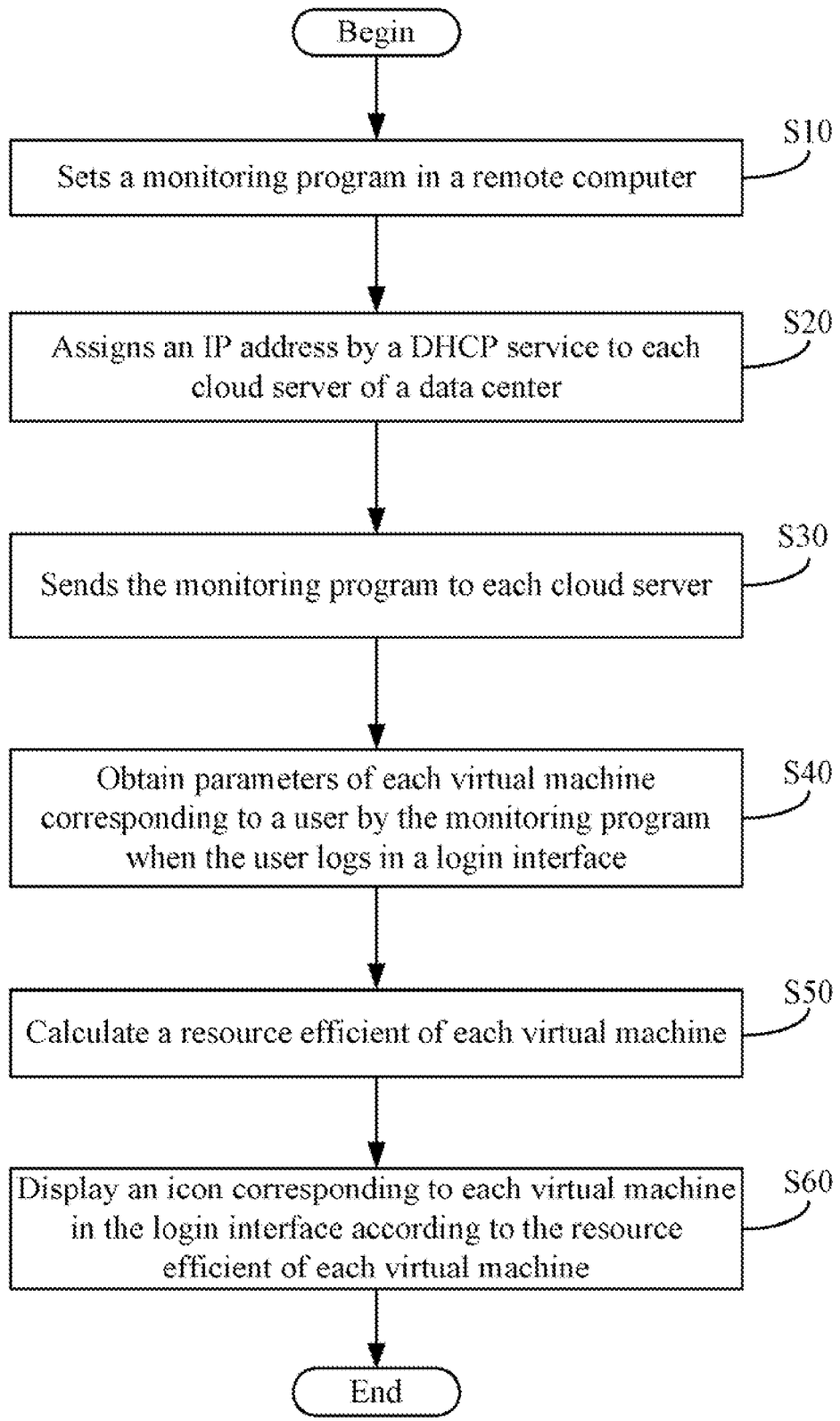
FIG. 3 is a flowchart of one embodiment of a virtual machine sequence method.

FIG. 3 is a flowchart of one embodiment of a virtual machine sequence method. Depending on the embodiment, additional steps may be added, others deleted, and the ordering of the steps may be changed.

In step S10, the setting module 210 sets a monitoring program, and stores the monitoring program in the storage system 270 of the remote computer 20. As mentioned above, the monitoring program obtains parameters of the virtual machines from the virtual machine management application.

In step S20, the assignment module 220 assigns an IP address using the DHCP service to each cloud server 500 of the data center 50 and communicates with each cloud server 500 by the assigned IP address.

In step S30, the sending module 230 sends the monitoring program to each cloud server 500. For example, if the data center 50 includes the cloud servers 500, namely A, B, C and D, the sending module 230 sends the monitoring program to the cloud server A, B, C and D. The monitoring program is installed in the cloud servers A, B, C and D and is activated to be available for use in the cloud servers A, B, C and D.

In step S40, the obtaining module 240 obtains parameters of each virtual machine authorized to a user by the monitoring program when the user logs in a login interface 600 in the client computer 10. In one embodiment, the user can access or use the virtual machine when virtual machine is authorized to the user. Each virtual machine authorized to the user may be installed in each cloud servers 500. For example, each virtual machine authorized to the user are stored in the cloud servers A, B and C. In one embodiment, when the user logs in a login interface 600, the obtaining module 240 searches for names of each virtual machine authorized to the user in the data center 50, and obtains parameters of each virtual machine authorized to the user by the monitoring program. For example, if the virtual machines authorized to the user are V1, V2, and V3, and the virtual machine V1 is installed in the cloud server A, the virtual machine V2 is installed in the cloud server B, the virtual machine V3 is installed in the cloud server B, then the obtaining module 240 obtains the parameters of the virtual machine V1 from the monitoring program installed in the cloud server A, the obtaining module 240 obtains the parameters of the virtual machine V2 from the monitoring program installed in the cloud server B, and the obtaining module 240 obtains the parameters of the virtual machine V3 from the monitoring program installed in the cloud server C.

In step S50, the calculation module 250 calculates a resource coefficient of each virtual machine according to the parameters of the virtual machine authorized to the user. The resource coefficient of each virtual machine is calculated by a formula as follow: USE(VM)=VMcoefficient+Wk×VMUsage as mentioned.

For example, if three virtual machines corresponds to the user, namely V1, V2 and V3, the resource coefficient of the virtual machine V1 is calculated as 0.71, the resource coefficient of the virtual machine V2 is calculated as 3.09, the resource coefficient of the virtual machine V3 is calculated as 1.31.

In step S60, the displaying module 260 displays an icon 601 corresponding to each virtual machine in the login interface 600 according to the resource coefficient of each virtual machine. For example, if three virtual machines corresponds to the user, namely V1, V2 and V3, the resource coefficient of the virtual machine V1 is 0.71, the resource coefficient of the virtual machine V2 is 3.09, the resource coefficient of the virtual machine V3 is 1.31, the icons V1, V2 and V3 are displayed in the login interface 600 in an order of V2, V1 and V3 as shown in FIG. 5.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A remote computer, the remote computer in communication with cloud servers of a data center, the remote computer comprising:
   at least one processor; and
   a storage system that stores each programs, that executed by the at least one processor, cause the at least one processor to perform a virtual machine sequence method, the method comprising:
   sending a monitoring program from the remote computer to each cloud server, wherein the cloud server is installed each virtual machine;
   obtaining parameters of each virtual machine authorized to a user by the monitoring program when a user logs in a login interface of a client computer, wherein the client computer communicates with the remote computer;
   calculating a resource coefficient of each virtual machine according to the parameters of the virtual machine authorized to the user; and
   displaying icons of each virtual machine authorized to the user in the login interface in an order determined according to the resource coefficients of each virtual machine.

2. The remote computer of claim 1, wherein the parameters of each virtual machine in the cloud server comprises a CPU utilization rate of the virtual machine in the cloud server, a memory utilization rate of the virtual machine in the cloud server, an application utilization rate of the virtual machine in the cloud server, and a total running time of the virtual machine in the cloud server.

3. The remote computer of claim 2, wherein the resource coefficient of each virtual machine is calculated as USE(VM)=VMcoefficient+Wk×VMUsage, USE(VM) represents the resource coefficient of the virtual machine.

4. The remote computer of claim 1, wherein VMcoefficient=Wc×f(VMCPU)+Wm×g(VMMemory)+Wr×k(VMProcess), f(VMCPU) represents the CPU utilization rate of the virtual machine in the cloud server, g(VMMemory) represents the memory utilization rate of the virtual machine in the cloud server, k(VMProcess) represents the application utilization rate of the virtual machine in the cloud server, Wk, Wm and Wr are constants.

5. The remote computer of claim 3, wherein VMUsage=Select(VMt)/T, Select(VMt) represents the total running time of the virtual machine in the cloud server, T represents a time unit.

6. A computer-based installation method being performed by execution of computer readable program code by a processor of a remote computer, the remote computer in communication with cloud servers of a data center, the method comprising:
   sending a monitoring program from the remote computer to each cloud server, wherein the cloud server comprises virtual machines;
   obtaining parameters of each virtual machine authorized to a user by the monitoring program when a user logs in a login interface in a client computer, wherein the client computer communicates with the remote computer;
   calculating a resource coefficient of each virtual machine according to the parameters of the virtual machine authorized to the user; and
   displaying icons of each virtual machine authorized to the user in the login interface in an order determined according to the resource coefficients of each virtual machine.

7. The method of claim 6, wherein the parameters of each virtual machine in the cloud server comprises a CPU utilization rate of the virtual machine in the cloud server, a memory utilization rate of the virtual machine in the cloud server, an application utilization rate of the virtual machine in the cloud server, and a total running time of the virtual machine in the cloud server.

8. The method of claim 7, wherein the resource coefficient of each virtual machine is calculated as USE(VM)=VMcoefficient+Wk×VMUsage, USE(VM) represents the resource coefficient of the virtual machine.

9. The method of claim 8, wherein VMcoefficient=Wc×f(VMCPU)+Wm×g(VMMemory)+Wr×k(VMProcess), f(VMCPU) represents the CPU utilization rate of the virtual machine in the cloud server, g(VMMemory) represents the memory utilization rate of the virtual machine in the cloud server, k(VMProcess) represents the application utilization rate of the virtual machine in the cloud server, Wk, Wm and Wr are constants.

10. The method of claim 9, wherein VMUsage=Select(VMt)/T, Select(VMt) represents the total running time of the virtual machine in the cloud server, T represents a time unit.

11. A non-transitory computer-readable medium having stored thereon instructions that, when executed by a remote computer, the remote computer in communication with cloud servers of a data center, causing the remote computer to perform a virtual machine sequence method, the method comprising:
   sending a monitoring program from the remote computer to each cloud server, wherein the cloud server comprises virtual machines;
   obtaining parameters of each virtual machine authorized to a user by the monitoring program when a user logs in a login interface in a client computer, wherein the client computer communicates with the remote computer;
   calculating a resource coefficient of each virtual machine according to the parameters of the virtual machine authorized to the user; and
   displaying icons of each virtual machine authorized to the user in the login interface in an order determined according to the resource coefficients of each virtual machine.

12. The non-transitory medium of claim 11, wherein the parameters of each virtual machine in the cloud server comprises a CPU utilization rate of the virtual machine in the cloud server, a memory utilization rate of the virtual machine in the cloud server, an application utilization rate of the virtual machine in the cloud server, and a total running time of the virtual machine in the cloud server.

13. The non-transitory medium of claim 12, wherein the resource coefficient of each virtual machine is calculated as USE(VM)=VMcoefficient+Wk×VMUsage, USE(VM) represents the resource coefficient of the virtual machine.

14. The non-transitory medium of claim 13, wherein VMcoefficient=Wc×f(VMCPU)+Wm×g(VMMemory)+Wr×k(VMProcess), f(VMCPU) represents the CPU utilization rate of the virtual machine in the cloud server, g(VMMemory) represents the memory utilization rate of the virtual machine in the cloud server, k(VMProcess) represents the application utilization rate of the virtual machine in the cloud server, Wk, Wm and Wr are constants.

15. The non-transitory medium of claim 13, wherein VMUsage=Select(VMt)/T, Select(VMt) represents the total running time of the virtual machine in the cloud server, T represents a time unit.

* * * * *